(12) United States Patent
Howard

(10) Patent No.: US 7,566,080 B2
(45) Date of Patent: Jul. 28, 2009

(54) SYSTEMS AND METHODS FOR COUPLING CONDUITS OF DISSIMILAR MATERIALS WHICH ARE SUBJECT TO LARGE TEMPERATURE VARIATIONS

(75) Inventor: Erik M. Howard, Baytown, TX (US)

(73) Assignee: Taper-Lok Corporation, Houston, TX (US)

( * ) Notice: Subject to any disclaimer, the term of this patent is extended or adjusted under 35 U.S.C. 154(b) by 343 days.

(21) Appl. No.: 11/217,564

(22) Filed: Sep. 1, 2005

(65) Prior Publication Data

US 2007/0007767 A1    Jan. 11, 2007

(51) Int. Cl.
*F16L 23/00* (2006.01)

(52) U.S. Cl. ................................ 285/368; 285/905

(58) Field of Classification Search ............... 285/187, 285/368, 364, 381.1, 381.3, 905
See application file for complete search history.

(56) References Cited

U.S. PATENT DOCUMENTS

| | | | | |
|---|---|---|---|---|
| 2,695,184 | A * | 11/1954 | Hobbs | 285/187 |
| 3,632,143 | A * | 1/1972 | Lessmann | 285/187 |
| 3,746,374 | A * | 7/1973 | Sedgwick et al. | 285/187 |
| 4,015,745 | A * | 4/1977 | Petrangelo | 285/187 |
| 4,349,203 | A * | 9/1982 | Schulke | 285/187 |
| 4,421,325 | A * | 12/1983 | Napolitano | 285/187 |
| 4,552,386 | A * | 11/1985 | Burchette | 285/187 |
| 4,743,035 | A * | 5/1988 | Van Loom et al. | 285/187 |
| 6,173,996 | B1 * | 1/2001 | Derakhshan et al. | 285/187 |
| 6,227,575 | B1 * | 5/2001 | Monning et al. | 285/187 |

* cited by examiner

*Primary Examiner*—David E Bochna
(74) *Attorney, Agent, or Firm*—Law Offices of Mark L. Berrier

(57) ABSTRACT

Systems and methods for coupling pipes made of dissimilar materials in applications that are subject to large variations in temperature. In one embodiment, a connection comprises a first flange made of a first material and a second flange made of a second material. Each flange is designed to be welded to a pipe of the same material. One of the flanges has a male mating surface, while the other flanges as a female mating surface. The male flange is made of the material that experiences greater expansion or less contraction when the temperature of the connection is changed from a connection temperature to an operating temperature. The female flange is made of the other material. A sealing ring having elastic properties is preferably used between the mating surfaces of the flanges.

8 Claims, 3 Drawing Sheets

SYSTEMS AND METHODS FOR COUPLING CONDUITS OF DISSIMILAR MATERIALS WHICH ARE SUBJECT TO LARGE TEMPERATURE VARIATIONS

BACKGROUND

1. Field of the Invention

The invention relates generally to pipe connections, and more particularly to systems and methods for coupling pipes made of dissimilar materials in applications that are subject to large variations in temperature.

2. Related Art

While there are a variety of systems and techniques for making connections between pipes in a variety of applications, many of these are not well suited to transition joints that undergo large variations in temperature. Conventional connections may experience problems in this situation not only because of the very large differences in temperature, but also because of the cycling of these temperature differences. These factors may cause conventional connections to leak or to experience more serious failures.

Transition joints are joints between pipes that are made of dissimilar materials. The problems with conventional connections arise from the fact that the different materials used in transition joints expand and contract at different rates when the temperatures of the connections change. It is common, for example, in cryogenic systems to require the coupling of an aluminum pipe to a steel pipe. A traditional connection would be made by coupling an aluminum flange to the aluminum pipe and a steel flange to the steel pipe. The flanges would then be coupled together with a seal or gasket between them. If this connection were made at a particular temperature and remained at this temperature, it might not experience any problems at all. When the temperature of the connection is changed, however, the two flanges expand or contract at different rates, causing relative movement between them, or between the flanges and the gasket, potentially causing the connection to leak. The expansion or contraction of the flanges could also cause the connection to lose contact pressure between the flanges and the gasket, which could cause or exacerbate leaks.

Attempts to address these problems in the prior art focus on trying to eliminate the mechanical interface between the dissimilar metals. This is typically done in two ways. One way is to use a pair of flanges, each made of a different one of the dissimilar metals, and a gasket that is made of both metals (see FIG. 1.) The gasket has two opposing contact surfaces, each of which contacts a corresponding one of the flanges. The surface of the gasket that contacts the first flange is made of the same metal as the first flange, while the surface of the gasket that contacts the second flange is made of the same metal as the second flange. Because of the difficulty of joining the dissimilar metals using techniques such as conventional welding, the two metals in the gasket are typically explosion welded together.

Another way in which the mechanical interface between the dissimilar metals is eliminated in the prior art is to use a pipe section that is manufactured from both of the metals (see FIG. 2.) Typically, the pipe section consists of a first segment that is made of a first one of the metals and a second segment that is made of a second one of the metals. The two segments are explosion welded together to form a pipe section having one end made of the first metal and the other end made of the second metal. Each end of this pipe section is conventionally welded to the pipe that is made of the same metal in order to make the connection.

Both of the approaches have limitations. For instance, because the dissimilar metals need to be explosion welded, there are limitations on the sizes of the parts having both metals (i.e., the two-metal pipe section and gasket.) As the sizes of the parts increase, the difficulty of making a good weld increases, so the parts must be relatively small (typically no more than 18 inches in diameter.) Further, because of the difficulties involved with explosion welding, there is a perception in the industry that an explosion weld appears may fail even though it appears to be a good weld. In the case of the two-metal pipe section, a failure of the weld could result in a catastrophic failure of the system in which it is used. As a result of the perception that explosion welded connections are not as reliable as conventional connections (e.g., conventionally welded connections or bolted flanges,) connections that employ explosion welding may be less desired by those who might use them.

It would therefore be desirable to provide systems and methods for making connections between pipes made of dissimilar materials (e.g., aluminum and steel) in systems that experience extreme temperatures and/or extreme variations in temperature that may cause conventional connections to leak or fail altogether.

SUMMARY OF THE INVENTION

One or more of the problems outlined above may be solved by the various embodiments of the invention. Broadly speaking, the invention comprises systems and methods for coupling conduits made of dissimilar materials, where the connection is resistant to leakage resulting from large variations in temperature. The connection includes a male flange and a female flange, where each flange is made of a different material and each material has a different coefficient of expansion. The male flange is made of the material that will expand relative to the other material when the temperature of the connection is changed from a temperature at which the connection is made to a temperature at which the connection is operated. The female flange is made of the other material. (It should be noted that the relative expansion may be either greater expansion when the temperature is increased, or less shrinkage when the temperature is decreased.) As a result, the male flange fits more tightly in the female flange at the operating temperature, increasing the effectiveness of the seal.

One alternative embodiment comprises a connection between conduits of dissimilar materials, including a male flange having an outwardly-facing male mating surface and a female flange having an inwardly-facing female mating surface. Each of the flanges is made of a different one of the dissimilar materials. The material for the flanges is selected so that, when the temperature of the connection is changed from a temperature at which the connection is made to an operating temperature, the male flange expands relative to the female flange. If the operating temperature of the connection is less than the temperature at which the connection is made, the male flange shrinks, but does so to a lesser degree than the female flange. In one embodiment, the connection includes a sealing ring positioned between the female mating surface and the male mating surface. The sealing ring may have a tapered cross-section and may have a gap between the surfaces that contact the flanges to give the sealing ring some elasticity.

Another alternative embodiment comprises a method for coupling conduits of dissimilar materials, including determining whether the operating temperature of the connection is above or below the temperature at which the connection is assembled, determining which of the dissimilar materials has a higher coefficient of expansion, providing male and female flanges (where each of the flanges is made of a different one of the dissimilar materials,) selecting which of the flanges is made of which material (to have the male flange expand relative to the female flange when moving to the operating temperature,) assembling the flanges and changing the temperature of the assembled flanges to the operating temperature.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
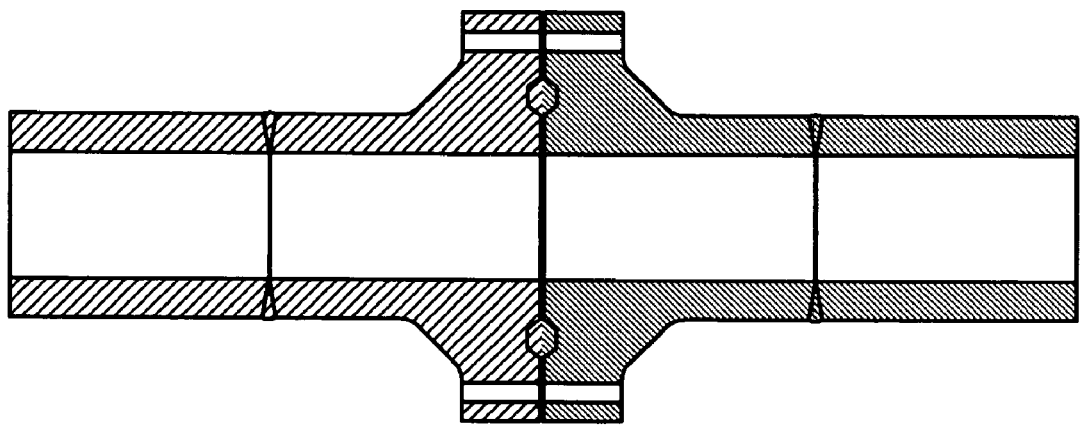
FIG. 1 is a diagram illustrating a connection that utilizes an explosion welded gasket between flanges of different materials in accordance with the prior art.
Figure 2:
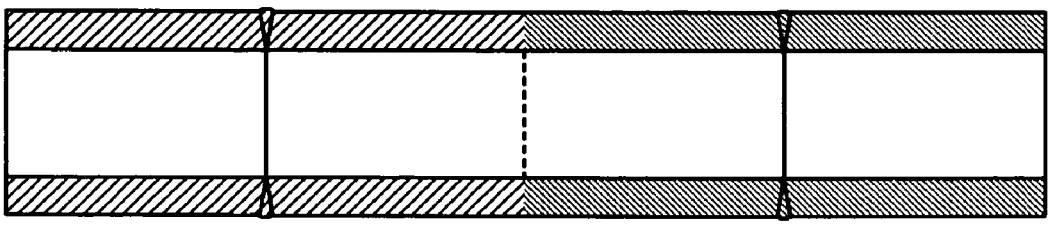
FIG. 2 is a diagram illustrating a connection that utilizes an explosion welded pipe section that is conventionally welded to pipes of different materials in accordance with the prior art.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for coupling conduits made of dissimilar materials, where the connection is resistant to leakage resulting from large variations in temperature. The connection includes a male flange and a female flange, where each flange is made of a different material and each material has a different coefficient of expansion. The male flange is made of the material that will expand relative to the other material when the temperature of the connection is changed from a temperature at which the connection is made to a temperature at which the connection is operated. The female flange is made of the other material. (It should be noted that the relative expansion may be either greater expansion when the temperature is increased, or less shrinkage when the temperature is decreased.) As a result, the male flange fits more tightly in the female flange at the operating temperature, increasing the effectiveness of the seal.

In an exemplary application, it is necessary to provide a connection for coupling a pipe made of a first material to a pipe made of a second material. It is assumed that these materials have different coefficients of expansion and are not susceptible to being welded to each other (e.g., aluminum and steel.) In one embodiment, a bolted flange connection is used to couple the pipes to each other. The connection includes one flange that is made of the first material and a second flange that is made of the second material. Each flange is welded to the pipe that is made of the same material.

One of the flanges has a male mating surface, while the other flanges as a female mating surface. When the flanges are coupled together, the male mating surface fits within a recess formed by the female mating surface. Which of the flanges is male and which of the flanges is female depends upon whether the operating temperature of the connection is higher or lower than the temperature at which the connection is made (assembled.) If the operating temperature is higher than the temperature at which the connection is made, the flange made of the material having the higher coefficient of expansion will be the male flange, and flange made of the other material will be female. If, on the other hand, the operating temperature is lower than the temperature at which the connection is made, the flange made of the material having the lower coefficient of expansion will be the male flange, and the flange made of the material having the higher coefficient of expansion will be the female flange.

In one embodiment, a sealing ring is positioned between the sealing surfaces of the flanges to improve the effectiveness of the seal between the flanges. The sealing ring may, for example, have a tapered design so that pressurization of the connection increases the contact pressure between the flanges and the sealing ring, thereby improving the effectiveness of the seal. In one embodiment, the sealing ring is designed so that the contact surfaces can flex and thereby maintain desirable levels of contact pressure between the contact surfaces and the mating surfaces of the flanges.

Figure 3:
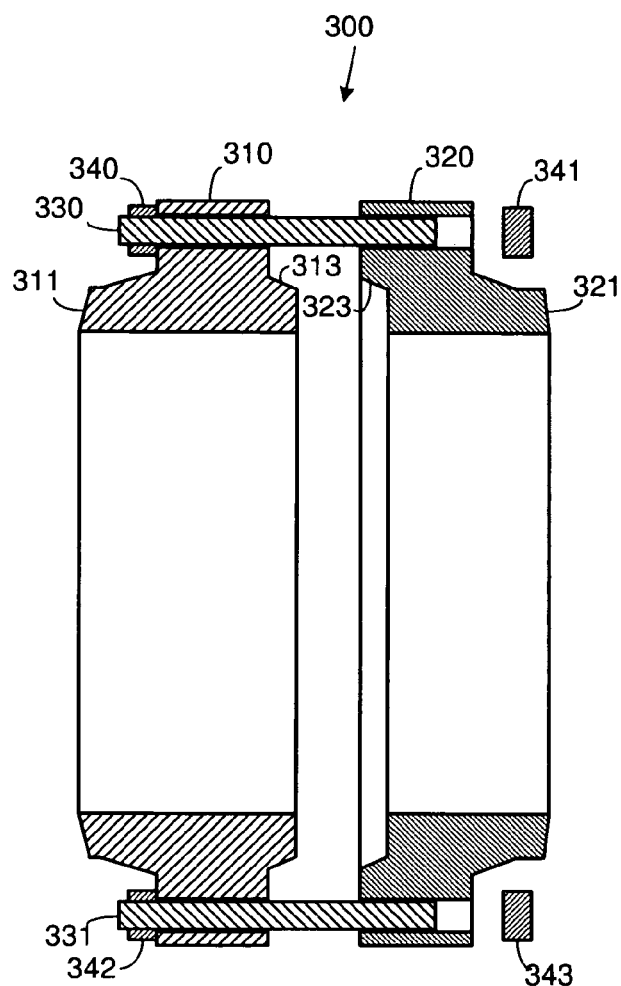
FIG. 3 is a cross-sectional view of a disassembled pipe connection in accordance with one embodiment.
Figure 4:
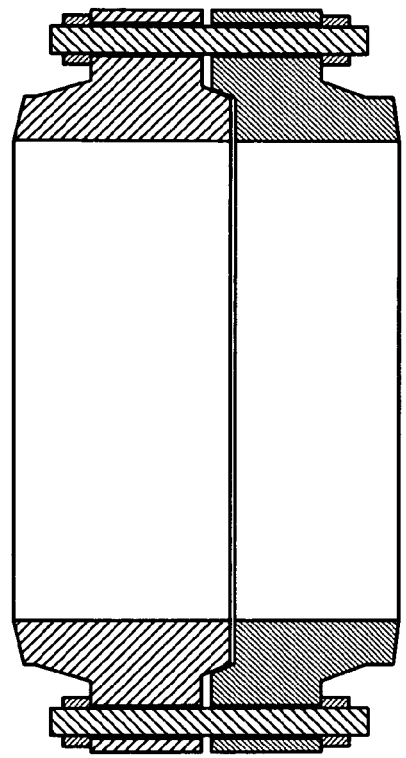
FIG. 4 is a cross-sectional view of an assembled pipe connection in accordance with one embodiment.

Referring to FIGS. 3 and 4, a pair of cross-sectional views of a pipe connection in accordance with one embodiment is shown. FIG. 3 is a view of the connection in a partially disassembled state, while FIG. 4 is a view of the connection in an assembled state.

Referring to FIG. 3, connection 300 consists primarily of a male flange 310 and a female flange. Each of flanges 310 and 320 has a beveled edge (311 and 321, respectively) that is designed to be welded to a corresponding pipe section. Each flange is made of the same material as the pipe section to which it will be welded. For example, if one of the pipe sections to be joined by the connection is made of aluminum and the other is made of steel, one of the flanges will be aluminum and the other will be steel.

Each of flanges 310 and 320 has a mating surface that is designed to mate with that of the other flange. In other words, the mating surfaces of the flanges fit together with one surface inside the other when the flanges are brought into contact with each other. As depicted in FIGS. 3 and 4, flange 310 has a male mating surface 313. Male mating surface 313 is an outwardly-facing conic section that appears as a tapered surface in the figures. Flange 320, on the other hand, has a female mating surface 323, which is an inwardly-facing conic section. Female mating surface 323 appears in the figures as a tapered surface which is essentially complementary to the taper of male mating surface 313. Flange 320 therefore has a recessed region formed by female mating surface 323 into which a projecting region formed by male mating surface 313 fits when the two flanges are coupled together.

Referring to FIG. 4, connection 300 is shown in an assembled state. When connection 300 is assembled, flange 310 is brought into mating contact with flange 320. That is, the flanges are brought together so that male mating surface 313 fits matingly within the recess formed by female mating surface 323. Bolts 330 and 331 are placed through bolt holes in each of the flanges, and nuts 340-343 are threaded onto the bolts to hold the flanges together. Nuts and 340-343 are tightened in order to apply contact pressure between mating surfaces 313 and 323. (it should be noted that, although only two bolts and corresponding nuts are in explicitly depicted in the figures, there will typically be many more bolts coupling the flanges to each other.) In this embodiment, the connection between the flanges is sealed by contact between mating surfaces 313 and 323.

As noted above, flanges and 310 and 320 are made of different materials, such as aluminum and steel. The intended use for the connection determines which of the flanges is made of which of the materials. If the connection will be used at a temperature which is below the temperature at which the connection is assembled, each of the flanges will experience some shrinkage after assembly as a result of the reduced temperature. Because it is preferable to increase the contact pressure between the flanges as the temperature is reduced (as opposed to reducing the contact pressure,) the material having the greater coefficient of expansion is selected as the material for flange 320 (the female flange,) while the material having them smaller coefficient of expansion is selected as the material for flange 310 (the male flange.) In the case of a connection between aluminum and steel, the coefficient of expansion of aluminum is roughly twice that of steel, so aluminum would be used to manufacture the female flange. Then, when the temperature is reduced, the female flange will experience more shrinkage than the male flange, and the contact pressure between the mating surfaces will increase.

It should be noted that, while the operating temperature for the connection described above is lower than the temperature at which the connection is made, there are also applications in which the operating temperature is greater than the temperature at which the connection is made. In these applications, the flanges will experience expansion rather than shrinkage. It is therefore necessary to reverse the relationship between the materials and the male/female flanges. In other words, rather than using the higher-coefficient-of-expansion material for the female flange, this material would be used for the male flange. The female flange would be made from the material having the lower coefficient of expansion. As a result, when the temperature of the connection is increased, the male flange will expand to a greater degree than the female flange, increasing the contact pressure between the mating surfaces of the flanges. In both the increased-temperature case and the decreased-temperature case, the connection can be described as having a male flange that expands relative to the female flange when the temperature changes from the connection temperature to the operating temperature. In other words, the male flange either expands to a greater degree or shrinks to a lesser degree than the female flange.

The embodiment of FIGS. 3 and 4 is a very simple design in which there is no gasket or other sealing ring positioned between the contact surfaces of the two flanges. This exemplary embodiment is presented to show the relationship between the different materials that are used in the connection and the specific (male/female) flanges which are made of these materials. It is contemplated that this gasket-less design will not perform as well in many applications as similar designs which incorporate gaskets or sealing rings. Several alternative embodiments that incorporate these components will therefore be described below.

Figure 5:
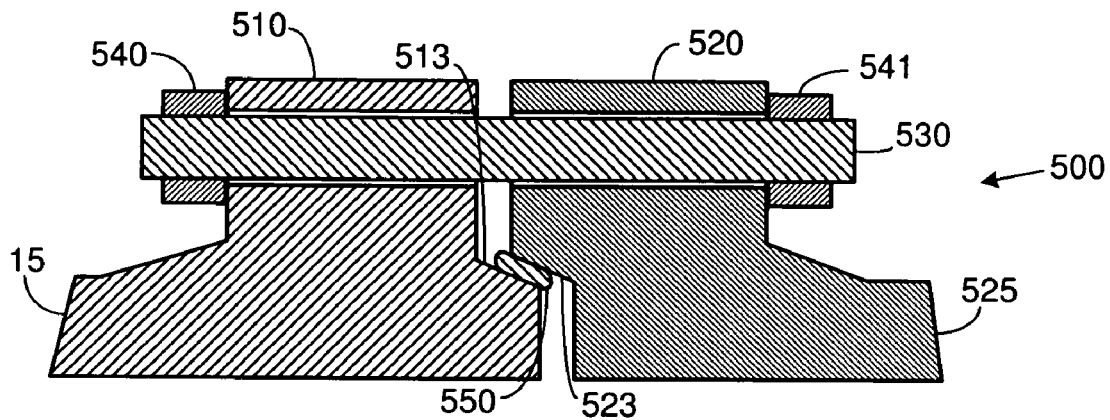
FIG. 5 is a diagram illustrating the use of a conventional seal between male and female flanges in accordance with one embodiment.

Referring to FIG. 5, an alternative embodiment illustrating the use of a conventional seal is shown. As depicted in this figure, connection 500 includes a male flange 510 and a female flange 520. Flanges 510 and 520 are configured to be bolted together using a set of threaded bolts (e.g., 530) and corresponding nuts (e.g., 540, 541.) Each flange has a corresponding mating surface (513, 523) that is configured to make contact with and compress a seal ring 550 in order to effect a seal between the flanges. Each of the flanges also includes a tapered surface (515, 525) that is designed to allow the flange to be welded to a corresponding section of pipe.

In the embodiment of FIG. 5, seal ring 550 is a simple o-ring. O-ring 550 is elastic or malleable and may, for example, have a circular cross-section. When the connection is made (i.e., when flanges 510 and 520 are coupled together,) mating contact surfaces 513 and 523 come into contact with o-ring 550 and begin to compress it. As the mating surfaces of the flanges are brought closer together, o-ring 550 is deformed by the mating surfaces and fills more of the gap between the flanges. The bolts of the connection are tightened until a desired amount of contact pressure has been applied to the o-ring by the mating surfaces, at which point the assembly of the connection is complete. When connection 500 is put into service, the temperature of the connection is decreased (or increased) to an appropriate operating temperature. As described above, the materials of the flanges are selected so that the change in temperature causes the male flange to expand with respect to the female flange (either by expanding more than the female flange as the temperature increases, or by shrinking less than the female flange as the temperature decreases.) As this occurs, additional contact pressure is applied to o-ring 550, which is further compressed and therefore increases the effectiveness of the seal between the flanges.

Figure 6:
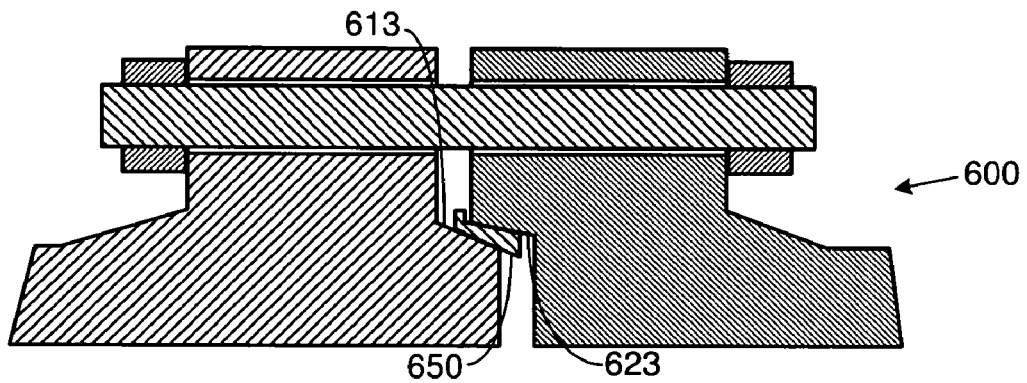
FIG. 6 is a diagram illustrating the use of a tapered seal between male and female flanges in accordance with one embodiment.

Referring to FIG. 6, another alternative embodiment is shown. In this embodiment, another type of sealing ring is used. Rather than a simple o-ring, connection 600 makes use of a tapered metal seal ring 650. Seal ring 650 has a tapered cross-section which is thicker at one end and (nearest the female flange) and narrower at the other end (nearest the male flange.) This cross-section is formed by an inner surface comprising a first conic section and an outer surface having a second conic section. Mating surfaces 613 and 623 are tapered at different angles so that these services match the tapered surfaces of young sealing ring 650. Because of the different tapers on the mating surfaces and sealing ring, pressure within the connection pushes the wedge-shaped sealing ring into the corresponding gap between the mating surfaces, thereby increasing the contact pressure between the mating surfaces and sealing ring and increasing the effectiveness of the seal. (If the connection is designed to be used in an externally pressurized application, the configuration of the tapered mating surfaces and sealing ring can be reversed so that the external pressure drives the wedge-shaped sealing ring more tightly into the gap between the flanges.)

Figure 7:
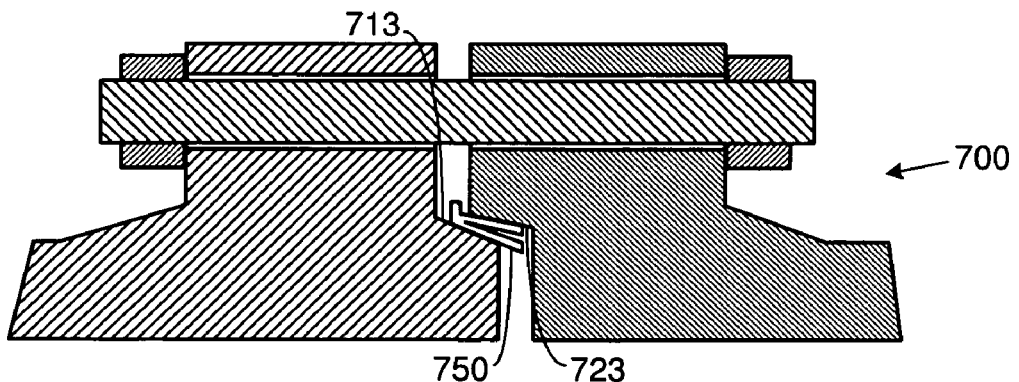
FIG. 7 is a diagram illustrating the use of a tapered spring seal between male and female flanges in accordance with one embodiment.

Referring to FIG. 7, another alternative embodiment is shown. In this embodiment, yet another type of sealing ring is used. Sealing ring 750 is similar to tapered seal ring 650, except that the body of the sealing ring (between the tapered surfaces that contact the mating surfaces of the flanges) is not solid. It can be seen that there is a wedge-shaped gap between the contact surfaces of the sealing ring. This gap allows the contact surfaces of the sealing ring to flex somewhat, thereby giving the sealing ring additional elasticity. In other words, the tapered sealing surfaces of the sealing ring that contact the mating surfaces of the flanges can be compressed and can then return to their uncompressed position. This is beneficial in the present invention because, when the temperature of the connection is changed from the temperature at which the connection is made to the operating temperature of the connection, the expansion/shrinkage of the flanges causes the seal ring to be compressed. When the connection is returned to the initial temperature, the compression of the seal ring is reduced, so it is advantageous to use a seal ring that is capable of returning to its initial, uncompressed size.

Several alternative embodiments that use different types of sealing rings between the mating flanges are described above. It should be noted that there may also be variations in other features of the invention in various alternative embodiments. For instance, while the embodiments described above make use of bolted flanges, alternative embodiments may use other mechanisms to couple the flanges, such as clamshell clamps.

It should be noted that the effectiveness of the seal in any of the above embodiments benefits from some elasticity in the portions of the flanges and/or sealing rings with respect to the contact surfaces. Specifically, it is desirable for the connection components to flex and thereby maintain sufficient contact pressure between the sealing surfaces to maintain a seal despite shrinkage and/or expansion of the parts in moving between the connection and operating temperatures. When a sealing ring is used, the elasticity may be most easily achieved in the sealing ring. As pointed out above in connection with the embodiment of FIG. 7, the sealing ring may be specifically designed to provide this elasticity. Alternatively, the portions of the flanges that form the male and female contact surfaces may be designed to interfere. In other words, they may be designed to occupy the same space. Obviously, they cannot both physically occupy this space at the same time, so they may force each other (via the contact pressure they exert on each other) to flex away from this space. This flexure (within the elastic limits of the parts) can provide some or all of the desired elasticity.

Although the foregoing embodiments relate to the connection of two pipes that are made of dissimilar materials, it should be noted that alternative embodiments may be used in applications that involve the connection of other types of components. These components may be enclosures, conduits, housings, or the like. Accordingly, references herein to any of these types of components should be construed to include any of the others as well.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A connection comprising:
   a first flange made of a first material and having an inwardly-facing female mating surface;
   a second flange made of a second material and having an outwardly-facing male mating surface configured to mate with the female mating surface of the first flange; and
   a sealing ring positioned between the female mating surface and the male mating surface, wherein the sealing ring has a gap between the inner and outer surfaces that enables the inner and outer surfaces to flex toward or away from each other;
   wherein the second material expands relative to the first material when the temperature of the connection is changed from a temperature at which the connection is made to an operating temperature.

2. The connection of claim 1, wherein the operating temperature of the connection is less than the temperature at which the connection is made and a coefficient of expansion of the second material is less than a coefficient of expansion of the first material.

3. The connection of claim 1, wherein the operating temperature of the connection is greater than the temperature at which the connection is made and a coefficient of expansion of the second material is greater than a coefficient of expansion of the first material.

4. The connection of claim 1, wherein the sealing ring has a tapered cross-section formed by a conic inner surface that is complementary to the male mating surface and a conic outer surface that is complementary to the female mating surface.

5. The connection of claim 1, wherein the male mating surface comprises an outwardly-facing conic section and the female mating surface comprises an inwardly-facing conic section.

6. The connection of claim 1, wherein the male and female flanges are configured to flex and to thereby elastically apply contact pressure between the male and female mating surfaces.

7. The connection of claim 1, further comprising a sealing ring, wherein the sealing ring is configured to flex and to thereby elastically apply contact pressure between the sealing ring and each of the male and female mating surfaces.

8. The connection of claim 1, wherein at least one of the outwardly-facing male mating surface of the male flange and the inwardly-facing female mating surface of the female flange is configured to flex and to thereby elastically apply contact pressure between the male and female mating surfaces.

* * * * *